United States Patent
Cornick et al.

(10) Patent No.: US 10,268,812 B2
(45) Date of Patent: *Apr. 23, 2019

(54) PHYSICAL TOKEN-LESS SECURITY SCREENING USING BIOMETRICS

(71) Applicant: Alclear, LLC, New York, NY (US)

(72) Inventors: Kenneth Cornick, New York, NY (US); Kevin Lupowitz, New York, NY (US); Matthew Snyder, New York, NY (US)

(73) Assignee: ALCLEAR, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/958,734

(22) Filed: Apr. 20, 2018

(65) Prior Publication Data

US 2018/0247041 A1     Aug. 30, 2018

Related U.S. Application Data

(63) Continuation of application No. 15/717,416, filed on Sep. 27, 2017, now Pat. No. 10,049,201, which is a (Continued)

(51) Int. Cl.
*G06F 21/32* (2013.01)
*G06Q 50/30* (2012.01)
*G07C 9/00* (2006.01)

(52) U.S. Cl.
CPC ............ *G06F 21/32* (2013.01); *G06Q 50/30* (2013.01); *G07C 9/00158* (2013.01); *G07C 9/00166* (2013.01)

(58) Field of Classification Search
CPC ....................................................... G06F 21/32
(Continued)

(56) References Cited

U.S. PATENT DOCUMENTS 7,598,857 B1 * 10/2009 Reagan .................. G08B 25/00
340/539.13
7,705,731 B2    4/2010 Trammell
(Continued)

FOREIGN PATENT DOCUMENTS

CN        101226653         7/2008
EP       2883218 A1        6/2015
(Continued)

OTHER PUBLICATIONS

International Search Report and Written Opinion, PCT/US2016/032532, filed May 13, 2016, 12 pages.
(Continued)

*Primary Examiner* — Santiago Garcia
(74) *Attorney, Agent, or Firm* — Brownstein Hyatt Farber Schreck, LLP

(57) ABSTRACT

In physical token-less security screening using biometrics, a person provides biometric data to a security computing device as part of a security screening. The biometric data is used by the security computing device to look up an identifier (such as an airline account identifier or a security status identifier) for the person from a security back end. The identifier is used by the security computing device to obtain electronic pass information (such as an electronic boarding pass or a security screening status indicator) from a third party computing system (such as an airline computing system or a clearinghouse), which may be used to clear the person and/or otherwise facilitate the security screening. In some implementations, these techniques may also be used for physical token-less pass processing (such as boarding pass-less airline processing, confirmation of assigned traveling credentials, or determination of security protocols).

20 Claims, 5 Drawing Sheets

Related U.S. Application Data continuation of application No. 15/618,659, filed on Jun. 9, 2017, now Pat. No. 9,870,459, which is a continuation of application No. 15/154,823, filed on May 13, 2016, now Pat. No. 9,721,081.

(60) Provisional application No. 62/161,330, filed on May 14, 2015.

(58) Field of Classification Search
USPC .......................................................... 340/5.83
See application file for complete search history.

(56) References Cited

U.S. PATENT DOCUMENTS

| | | | |
|---|---|---|---|
| 7,744,033 | B2 | 6/2010 | Linero |
| 8,279,067 | B2 | 10/2012 | Berger |
| 8,892,697 | B2 | 11/2014 | Nema |
| 9,003,196 | B2 | 4/2015 | Hoyos |
| 9,087,204 | B2 | 7/2015 | Gormley |
| 9,117,066 | B2 | 8/2015 | Nathan |
| 9,159,059 | B2 | 10/2015 | Daddabbo |
| 9,245,175 | B1 * | 1/2016 | Vladimir ............... G06F 21/32 |
| 9,460,572 | B2 * | 10/2016 | Cheikh ............... G07C 9/00031 |
| 9,481,197 | B2 | 11/2016 | Eckel |
| 9,721,078 | B2 | 8/2017 | Cornick |
| 2003/0128099 | A1 * | 7/2003 | Cockerham ............ G07B 15/00 340/5.7 |
| 2004/0078335 | A1 | 4/2004 | Calvesio |
| 2004/0133804 | A1 * | 7/2004 | Smith .................. G06Q 10/10 713/186 |
| 2004/0190757 | A1 * | 9/2004 | Murphy ................ G07B 15/00 382/115 |
| 2007/0205272 | A1 * | 9/2007 | Daddabbo ............ G06Q 20/18 235/382 |
| 2007/0284481 | A1 * | 12/2007 | Linero ................... B64D 9/00 244/137.1 |
| 2009/0189736 | A1 * | 7/2009 | Hayashi ................ G06F 21/32 340/5.81 |
| 2009/0322510 | A1 * | 12/2009 | Berger ................. G06Q 10/08 340/539.1 |
| 2011/0213709 | A1 * | 9/2011 | Newman ............... G06F 21/32 705/44 |
| 2013/0305059 | A1 * | 11/2013 | Gormley ................. G07F 7/08 713/189 |
| 2014/0032723 | A1 * | 1/2014 | Nema ................... G06Q 10/00 709/220 |
| 2014/0198958 | A1 * | 7/2014 | Nathan .................. G06F 21/32 382/116 |
| 2014/0289842 | A1 * | 9/2014 | Cornick ................. G06F 21/32 726/19 |
| 2014/0316562 | A1 | 10/2014 | Leitmann et al. |
| 2014/0337930 | A1 * | 11/2014 | Hoyos .................... H04L 63/10 726/4 |
| 2014/0363057 | A1 * | 12/2014 | Eckel ..................... G06F 21/32 382/116 |
| 2016/0012218 | A1 * | 1/2016 | Perna ................... G06K 9/0061 726/18 |
| 2016/0025545 | A1 * | 1/2016 | Saltzgiver ............ G01F 23/263 73/304 C |
| 2016/0227897 | A1 | 8/2016 | Jobling et al. |
| 2016/0277616 | A1 | 9/2016 | Leitmann et al. |
| 2016/0281412 | A1 | 9/2016 | Leitmann et al. |
| 2016/0343187 | A1 * | 11/2016 | Trani ................. G07C 9/00119 |

FOREIGN PATENT DOCUMENTS

| | | |
|---|---|---|
| EP | 2941863 A1 | 11/2015 |
| WO | WO0109796 | 2/2001 |
| WO | WO0137169 | 5/2001 |
| WO | WO03069447 | 8/2003 |
| WO | WO2012052808 A1 | 4/2012 |
| WO | WO2013043069 A1 | 3/2013 |
| WO | WO2013132273 A2 | 9/2013 |
| WO | WO2014077716 A1 | 5/2014 |
| WO | WO2015036738 A2 | 3/2015 |
| WO | WO2015076686 A1 | 5/2015 |
| WO | WO2015145139 A1 | 10/2015 |
| WO | WO2015145142 A1 | 10/2015 |

OTHER PUBLICATIONS

"Biometric-based, seamless airport processing to be trialled at Aruba Airport," Future Travel Experience, http://www.futuretravelexperience.com/2014/05, May 2014.

"Biometric technology—the key enabler of a single passenger token and improved passenger tracking?" Future Travel Experience, http://www.futuretravelexperience.com/2014/08, Aug. 2014.

* cited by examiner

PHYSICAL TOKEN-LESS SECURITY SCREENING USING BIOMETRICS

CROSS-REFERENCE TO RELATED APPLICATION

This application is a continuation of U.S. patent application Ser. No. 15/717,416, filed Sep. 27, 2017, and titled "Physical Token-Less Security Using Biometrics," which is a continuation application of U.S. patent application Ser. No. 15/618,659, filed Jun. 9, 2017, and titled "Physical Token-Less Security Screening Using Biometrics," now U.S. Pat. No. 9,870,459, issued Jan. 16, 2018, which is a continuation application of U.S. patent application Ser. No. 15/154,823, filed May 13, 2016, and titled "Physical Token-Less Security Screening Using Biometrics," now U.S. Pat. No. 9,721,081, issued Aug. 1, 2017, which claims the benefit of U.S. Provisional Patent Application No. 62/161,330, filed May 14, 2015, and titled "Physical Token-Less Security Screening Using Biometrics," the disclosure of which is hereby incorporated herein by reference in its entirety.

TECHNICAL FIELD

This disclosure relates generally to security screening, and more specifically to security screening using biometrics without obtaining physical tokens.

BACKGROUND

There are a variety of different situations in which service or other providers issue tickets or similar tokens to customers, which may be physical tokens or electronic tokens presented via physical electronic devices such as smart phones. In many situations, security screening for use of the tickets may be performed by a party other than the issuer of the ticket.

For example, people may be able to obtain tickets for flights at an airport from a variety of different airlines. Security screening at the airport is typically provided by a centralized authority that is separate from any of the airlines, such as the Transportation Security Administration. Such security screening may involve having people present boarding passes provided by an airline as well as some form of identification token. After clearing security, people may again present such a boarding pass at a gate in order to board a flight. Government regulators may also assign certain traveling credentials, such as statuses related to screening level or eligibility for expedited screening.

SUMMARY

The present disclosure relates to systems, methods, apparatuses, and computer program products for physical token-less security screening using biometrics (such as boarding pass-less airport security screening for flyers or boarding pass-less confirmation of assigned traveling credentials). A person may provide biometric data to a security computing device as part of a security screening. The biometric data may be used to look up an identifier for the person from a computing back end. The identifier may be used to have electronic pass information (such as electronic boarding pass information or a security screening status indicator) sent to the computing device, which may be used to clear the person and/or otherwise facilitate the security screening. In some implementations, these techniques may also be used for physical token-less pass processing (such as boarding pass-less airline processing or boarding pass-less determination of security protocols).

In various embodiments, a security screening computing device may include a non-transitory storage medium storing instructions, a communication component communicably connected to a back end and third party computing system (such as an airline computing system) and a processing unit coupled to the non-transitory storage medium and the communication component. The processing unit may execute the instructions to receive biometric data for a person (such as an image of a fingerprint), obtain a third party account identifier for the person (which may be an airline account identifier such as a frequent flyer number) from the back end in response to transmitting the biometric data, and retrieve electronic pass information (which may be electronic boarding pass information, or a security screening status indicator, and may include a real time status of the electronic boarding pass information) for the person from the third party computing system in response to transmitting the third party account identifier.

In some examples, the processing unit may further execute the instructions to determine that the person is authorized for security screening based on the electronic pass information.

In various examples, the security screening computing device may also include a display component operable to display the electronic pass information and/or a biometric reader operable to detect the biometric data for the person.

In some embodiments, a method for security screening may include obtaining biometric data for a person utilizing a computing device (such as a security station computing device), transmitting the biometric data to a back end from the computing device, receiving an identifier at the computing device from the back end in response to transmitting the biometric data, transmitting the identifier from the computing device to an airline computing system, receiving electronic boarding pass information for the person at the computing device from the airline computing system in response to transmitting the identifier, and determining whether or not to clear the person for security screening utilizing the computing device based at least on the electronic boarding pass information for the person.

In some examples, said determining operation may include determining whether or not the electronic boarding pass information indicates the person has a flight at an airport associated with the computing device and/or the flight is within a time period. In various examples, said determining operation may include determining not to clear the person for security screening if the electronic boarding pass information indicates that a ticket associated with the electronic boarding pass information has been cancelled. In various other examples, said determining operation may include determining whether to offer expedited or supplemental screening at the airport.

In various examples, the method may also include receiving additional biometric data at the back end from an airline computing device, looking up the identifier based on the additional biometric data and providing the identifier to the airline computing device for purposes of identification. The airline computing device may utilize the identifier as part of a check in or boarding process.

In various embodiments, a computer program product, tangibly embodied in a non-transitory storage medium may include a first set of instructions, stored in a non-transitory storage medium, executable by a processing unit to receive a frequent flyer identifier for a person from a back end in response to transmitting fingerprint data obtained from the person; a second set of instructions, stored in the non-transitory storage medium, executable by the processing unit to obtain electronic boarding pass information for the person from an airline computing system in response to transmitting the frequent flyer identifier for the person; and a third set of instructions, stored in the non-transitory storage medium, executable by the processing unit to facilitate a security screening process (which may be a prescreened security screening process) by displaying the electronic boarding pass information (which may include a current status of a flight for which the person has a ticket).

In some examples, displaying the electronic boarding pass information may include displaying whether or not the person has a ticket for a flight that day at an airport where the processing unit is located.

In various examples, the person may not provide a boarding pass and/or identification other than the fingerprint data as part of the security screening process.

In various embodiments, a method for security screening may include obtaining biometric data for a person utilizing a computing device; transmitting the biometric data to a back end from the computing device; receiving an identifier at the computing device from the back end in response to transmitting the biometric data; transmitting the identifier from the computing device to a clearinghouse; receiving a security screening status indicator for the person at the computing device from the clearinghouse in response to transmitting the identifier; and determining whether or not to clear the person for security screening utilizing the computing device based at least on the security screening status indicator for the person.

In some embodiments, a computer program product, tangibly embodied in a non-transitory storage medium may include a first set of instructions, stored in a non-transitory storage medium, executable by a processing unit to receive a security status identifier for a person from a back end in response to transmitting fingerprint data obtained from the person; a second set of instructions, stored in the non-transitory storage medium, executable by the processing unit to obtain a security screening status indicator for the person from a clearinghouse in response to transmitting the security status identifier for the person; and a third set of instructions, stored in the non-transitory storage medium, executable by the processing unit to facilitate a security screening process by displaying the security screening status indicator.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

Figure 1:
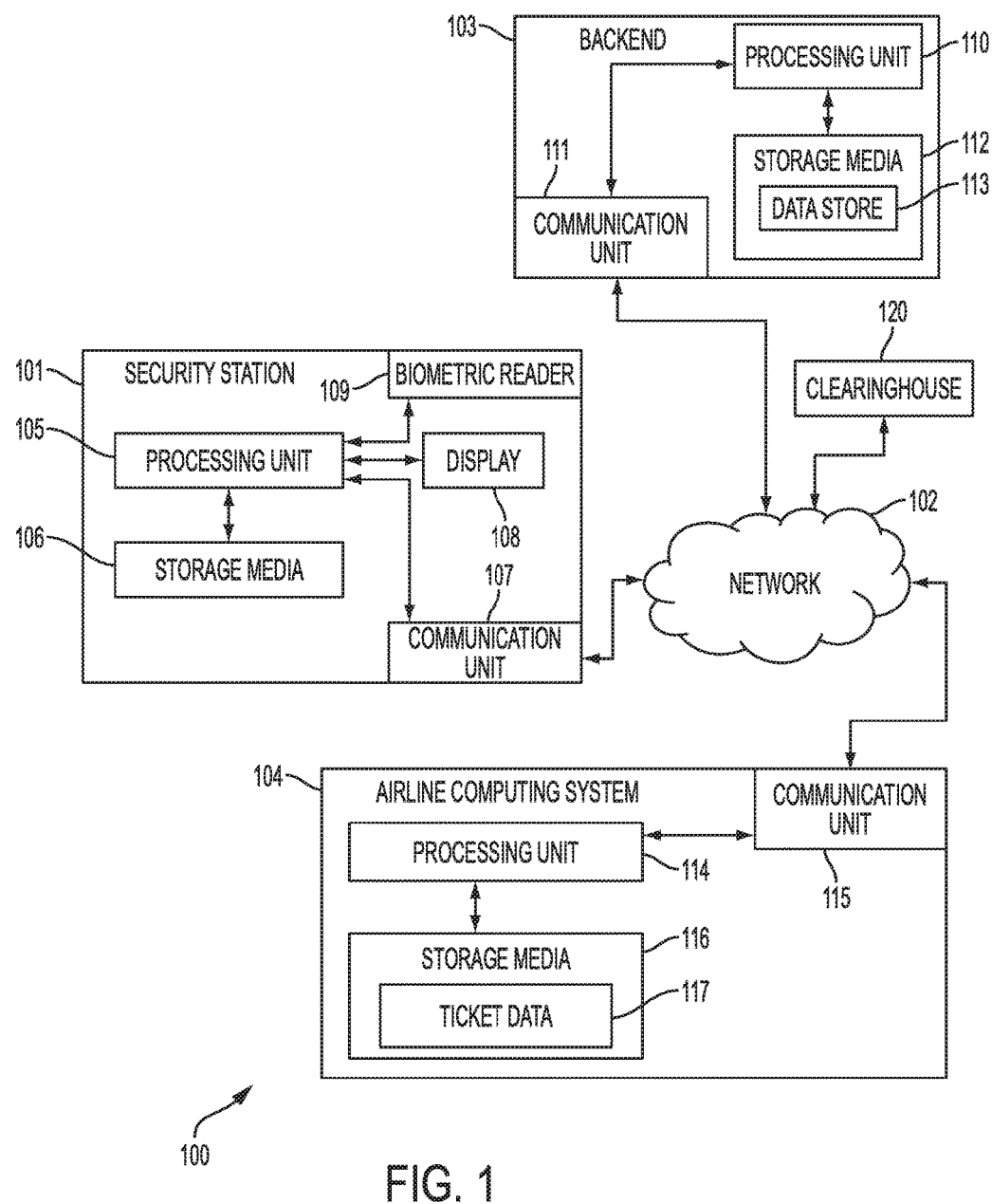
FIG. 1 is a block diagram illustrating a system for boarding pass-less airport security screening for flyers.

The description that follows includes sample systems, methods, and computer program products that embody various elements of the present disclosure. However, it should be understood that the described disclosure may be practiced in a variety of forms in addition to those described herein.

Having people present physical tokens (such as boarding passes) or physical evidence of such tokens (such as electronic tokens presented via an electronic device such as a smart phone) and/or identification at security screening may be burdensome for both the people and the security screening process. A person may be burdened by obtaining such a physical token, making sure he has appropriate identification, and having both available in hand during security screening. Security screening may be burdened by having to ensure that an appropriate boarding pass and valid appropriate identification is provided.

Further, tokens such as boarding passes are often printed documents and/or electronic representations thereof. As typical security screening is unaware of the actual source of such printed documents or electronic representations, security screening may be unable to detect forgeries. Additionally, even when the tokens were authorized at the time they were issued to a person, security screening may have no way of ascertaining whether or not they have subsequently been cancelled.

The present disclosure relates to systems, methods, apparatuses, and computer program products for physical token-less security screening using biometrics (such as boarding pass-less airport security screening for flyers). A person may provide biometric data to a security computing device as part of a security screening. The biometric data may be used to look up an identifier for the person from a computing back end. The identifier may be used to have electronic pass information (such as electronic boarding pass information) sent to the computing device, which may be used to clear the person and/or otherwise facilitate the security screening. In some implementations, these techniques may also be used for physical token-less pass processing (such as boarding pass-less airline processing). The identifier may alternatively and/or additionally be used to look up a security screening status indicator for the person from a computing back end, which may be sent to the computing device and used to convey specific security protocols to use in screening the person.

In some implementations, these techniques may also be used for physical token-less pass processing, such as boarding pass-less airline processing. For example, an airline computing device may obtain biometric data from a person which is used to obtain an identifier from a security screening back end. Based on the identifier, the airline computing device may obtain electronic boarding pass information that may be used for check in, boarding, and so on. As such, airline processing such as check in and boarding may also be performed without people providing boarding passes and/or identification other than the biometric.

FIG. 1 is a block diagram illustrating a system 100 for boarding pass-less airport security screening for flyers. The system 100 may include a security station computing device 101 communicably coupled to a security back end 103 and an airline computing system 104 via one or more wired or wireless communication networks 102.

The security station computing device 101 may include one or more processing units 105, non-transitory storage media 106 (which may take the form of, but is not limited to, a magnetic storage medium; optical storage medium; magneto-optical storage medium; read only memory; random access memory; erasable programmable memory; flash memory; and so on), communication units 107, displays 108, and/or biometric readers 109 (such as one or more fingerprint or palm print scanners, retinal scanners, and so on). Similarly, the security back end 103 and/or the airline computing system 104 may include one or more processing units 110 and 114, storage media 112 and 116, and/or communication units 111 and 115. Each of the security station computing device 101, the security back end 103, and/or the airline computing system 104 may be one or more of a variety of different computing devices such as a desktop computing device, a laptop computing device, a tablet computing device, a mobile computing device, a smart phone, multiple computing devices in a cloud or other computing system configuration, a server computing device, and so on.

The processing unit 105 of the security station computing device 101 may execute one or more instructions stored in the storage media 106 to perform one or more functions for the security station computing device 101. For example, the security station computing device 101 may obtain biometric data (such as an image or other electronic representation of a fingerprint, palm print, retina scan, and/or other biometric) from a person. The security station computing device 101 may transmit the biometric data to the security back end 103, which may use the biometric data to look up an identifier for the person (such as a frequent flyer identifier or other airline identifier) in a data store 113 stored in the storage media 112. In response, the security station computing device 101 may receive the identifier from the security back end 103. The security station computing device 101 may transmit the identifier to the airline computing system 104, which may look up electronic boarding pass information for the person based on the identifier in ticket data 117 stored in the storage media 116. In response, the security station computing device 101 may receive the electronic boarding pass information from the airline computing system 104.

The security station computing device 101 may display the electronic boarding pass information on the display 108 as part of the security screening process, such as to clear the person and/or otherwise facilitate the security screening. For example, security screening personnel may check the displayed boarding pass information to verify that the person is authorized to enter the airport and then search the person and/or any belongings of the person to verify that the person meets one or more security screening criteria. In this way, the security screening may be performed without the person providing a boarding pass and/or identification other than the biometric.

This may simplify security screening for the security screening provider, the person, and/or the airline in a number of ways. For example, the person may be freed from having to obtain and/or produce a boarding pass and/or identification. By way of another example, the security screening provider may not have to train security personnel to evaluate the validity of various forms of identification (such as state issued identification, passports, and so on). Additionally a security screening provider may receive authorization to provide different levels of physical screening.

Additionally, as the electronic boarding pass information is obtained from the airline computing system 104, the electronic boarding pass information cannot be forged by the person or similar party. Since the electronic boarding pass information is obtained in real time, the electronic boarding pass information can include a current status of the electronic boarding pass information (such as whether or not a ticket associated with the electronic boarding pass was cancelled subsequent to purchase, current gate and/or delay information, and so on), which may be used to determine whether or not to clear the person for the security screening.

In some implementations, the security station computing device 101 may validate the electronic boarding pass information. For example, the security station computing device 101 may determine whether or not the electronic boarding pass information indicates the person has a ticket for a flight at an airport at which the security station computing device 101 operates and/or is otherwise associated within a particular time period (such as that calendar day, within twenty four hours, and so on). The security station computing device 101 may present such validation information (such as via the display 108) to facilitate the security screening process by security screening personnel.

In various implementations, the above described security screening process may be part of a prescreened security process. In such a prescreened security process, the person may enroll in or be selected for a program where the person is determined to be less of a security risk than the general population such that the person is entitled to a lower security screening than the general population upon providing identification. Providing the biometric data to the security station computing device 101 may be that identification and proof of participation.

Although the present disclosure is illustrated and described within the context of security screening for airports, airlines, and electronic boarding pass information, it is understood that this is an example. In various implementations, techniques of the present disclosure may be used in any context where a security screening provider performs security screening for a service or other provider that issues any kind of ticket or other kind of token to customers without departing from the scope of the present disclosure.

For example, a person may be issued a badge for entering a particular area such as a garage by an operator of the area. The person may be screened for entry into the area by third party security. In such an example, the person may provide a biometric to security computing device. The security computing device may use the biometric to look up an identifier for the person associated with the operator of the area using a security back end and obtain access information from a virtual version of the badge obtained from a computing device of the operator of the area using the identifier. In this way, the third party security may be able to determine whether or not the person can be cleared to access the area without the person presenting the badge and/or identification other than the biometric, or what level of screening the person should experience.

The system 100 may include a clearinghouse 120 (a central database containing information on individuals) communicably coupled to the security station computing device 101 via the communication network 102. The clearinghouse 120 (which may include components similar to the security station computing device 101, the security backend 103, and/or the airline computing system 104) may be operated by a government or similarly associated agency and may store security screening status indicators associated with identifiers for various persons.

The security station computing device 101 may transmit the identifier for the person (which may be a security status identifier stored by and received from the security backend 103) to the clearinghouse 120 (whether directly or via the security backend 103) and receive a security screening status indicator in response. This security screening status indicator may be provided to personnel operating the security station computing device 101 to instruct the personnel regarding security protocols to use in clearing the person and/or otherwise utilized in clearing the person according to the security protocols.

For example, the clearinghouse 120 may be operated by a government agency as part of a prescreened security process. The clearinghouse 120 may store security screening status indicators for persons who have been prescreened and are thus eligible for a reduced security screening process. In such an example, the security station computing device 101 may transmit the identifier for the person to the clearinghouse 120 and receive back a security screening status indicator that indicates whether or not the person is eligible for the reduced screening process.

However, it is understood that this is an example and that the security screening status indicator may include other information. For example, in some implementations the security screening status indicator may indicate that a person is a heightened security risk and should be screened using a heightened security process.

In various implementations, the system 100 may include both the clearinghouse 120 and the airline computing system 104 and the identifier may be utilized to obtain electronic boarding pass information from the airline computing system 104 and a security screening status indicator from the clearinghouse 120. However, in other implementations the system 100 may include one of the clearinghouse 120 (to which one or more identifiers may be communicated to obtain the security screening status indicator) or the airline computing system 104 (to which one or more identifiers may be communicated to obtain the electronic boarding pass information). Various configurations are possible and contemplated.

Figure 2:
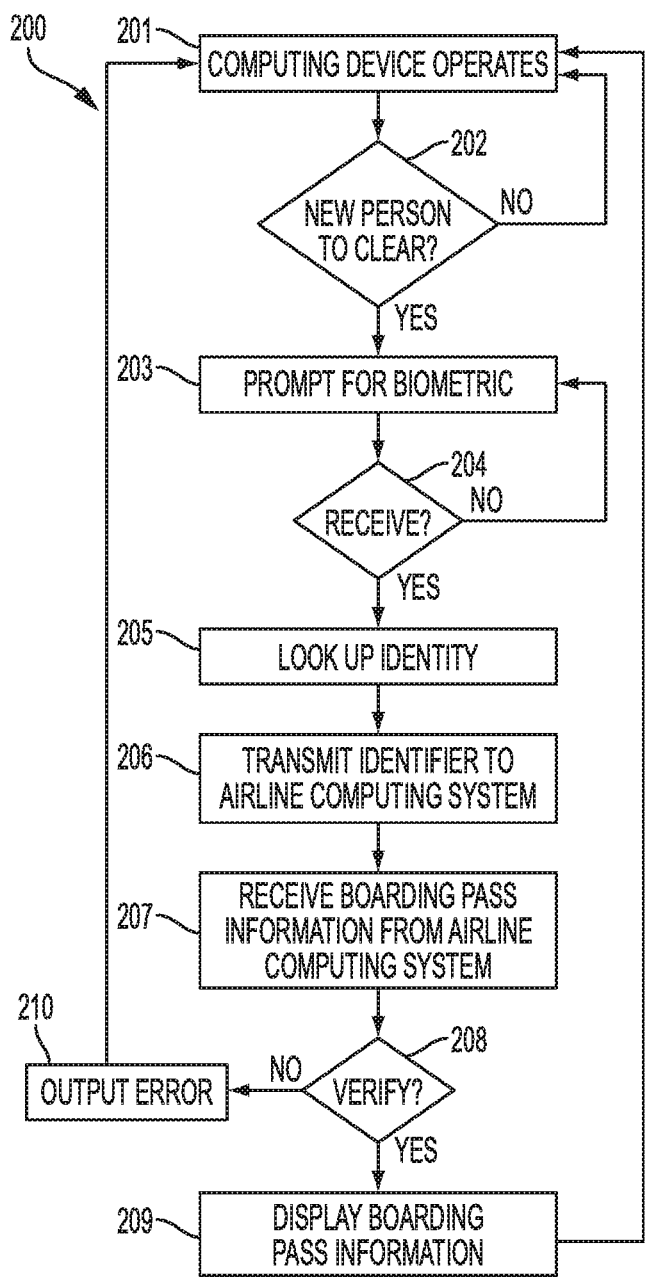
FIG. 2 is a flow chart illustrating a method for boarding pass-less airport security screening for flyers. This method may be performed by the system of FIG. 1.

FIG. 2 is a flow chart illustrating a method 200 for boarding pass-less airport security screening for flyers. This method 200 may be performed by the system 100 of FIG. 1.

At 201, a computing device may operate. At 202, the computing device may determine whether or not a new person is to be cleared as part of a security screening process. If not, the flow may return to 201 where the computing device continues to operate. Otherwise, the flow may proceed to 203.

At 203, after the computing device determines a new person is to be cleared, the computing device may prompt for the person to provide a biometric. The flow may then proceed to 204 where the computing device determines whether or not the requested biometric has been provided. If not, the flow may return to 203 where the computing device continues to prompt the person to provide the biometric. Otherwise, the flow may proceed to 205.

At 205, after the requested biometric is provided, the computing device may look up the identity of the person. The computing device may look up the identity of the person by transmitting the biometric to a back end and receiving an identifier such as a frequent flyer number or other airline identifier from the back end in response. The back end may match the biometric to a user account or other data store entry that identifies the person associated with the biometric along with other information. For example, the information may include name, address, phone number, driver's license or identification card number, passport number, one or more frequent flyer numbers, other airline identifiers, and/or other identifiers. The flow may then proceed to 206.

At 206, the computing device may transmit the identifier to an airline computing system. The airline computing system may use the identifier to look up real time boarding pass information and/or other real time information related to flights or other tickets associated with the identifier. The flow may then proceed to 207 where the computing device receives electronic boarding pass information from the airline computing system in response to transmitting the identifier.

Next, the flow may proceed to 208 where the computing device may verify the electronic boarding pass information. Such verification may include determining whether or not to clear the person for security screening. For example, said determining operation may include the computing device verifying that the electronic boarding pass information indicates that the person has a flight at the airport associated with the computing device, that the flight is that day or within a certain time period (such as twenty four hours), and so on. If the computing device successfully verifies the electronic boarding pass information, the flow proceeds to 209. Otherwise, if the computing device unsuccessfully attempts to verify the electronic boarding pass information, the flow proceeds to 210.

At 209, after the computing device successfully verifies the electronic boarding pass information, the computing device displays the electronic boarding pass information. This display of the electronic boarding pass information may be part of a security screening process, such as to clear the person and/or otherwise facilitate the security screening. The display may present any verifications that were performed as well as various information about the person and/or the electronic boarding pass information.

At 210, after the computing device unsuccessfully attempts to verify the electronic boarding pass information, the computing device may output an error message before the flow returns to 201 and the computing device continues to operate. Such an error may include errors that the person does not have a flight at the airport associate with the computing device, the person has been flagged (such as on a no flight or similar screening list), the person does not have a flight that day or within the certain time period, the person has no electronic boarding pass information, the person could not be identified, and/or any other such error.

Although the example method 200 is illustrated and described as including particular operations performed in a particular order, it is understood that this is an example. In various implementations, various orders of the same, similar, and/or different operations may be performed without departing from the scope of the present disclosure.

For example, although 205-207 are illustrated and described as looking up the identity of a person, transmitting an identifier to the airline computing system, and receiving electronic boarding pass information from the airline computing system, it is understood that this is an example. In various cases, one or more such operations may result in an error. For example, the identify of a person may not be able to be ascertained (such as where the biometric is not matched to anything in the back end) and an identifier may thus not be obtainable, the identity of a person may be ascertained but the back end may not store any identifiers, the airline computing system may not have any boarding pass information associated with the identifier, and so on. In such cases, the flow may proceed in the event of an error from any of 205-207 to 210 without proceeding through any of the other subsequent illustrated operations.

Figure 3:
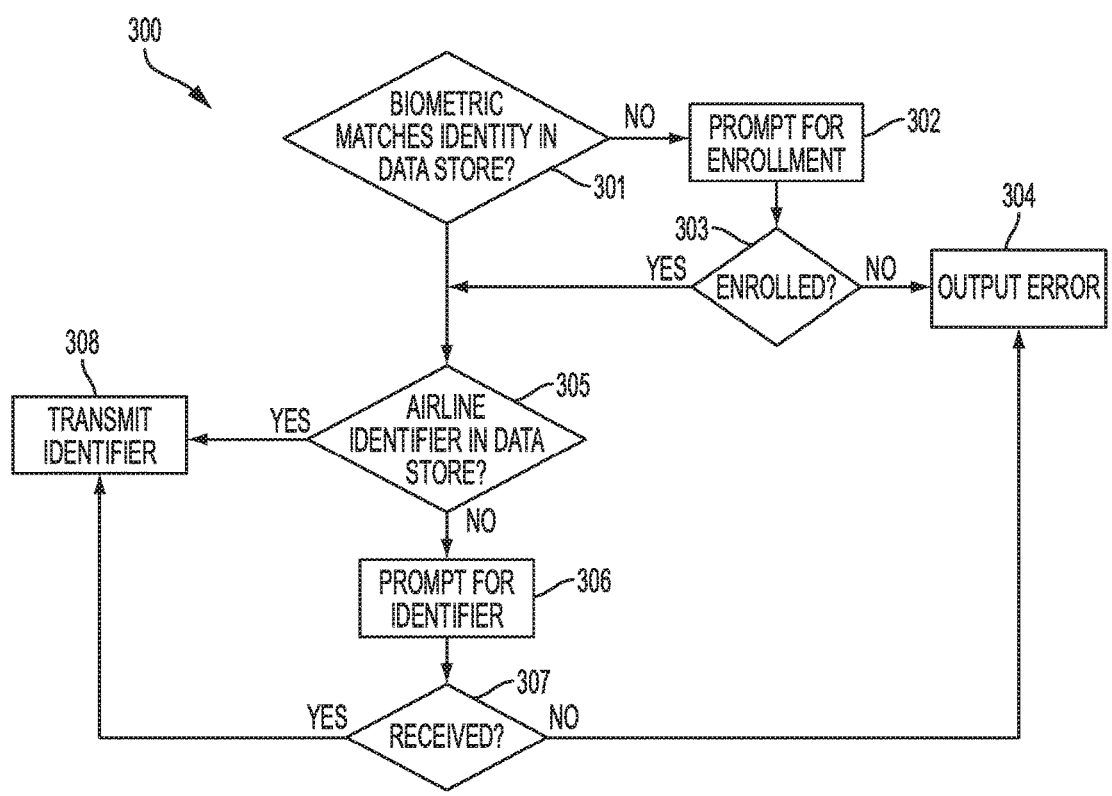
FIG. 3 is a flow chart illustrating an example of additional operations that may be performed as part of the method of FIG. 2 in some implementations.

Additionally, in some implementations one or more additional operations may be performed. For example, FIG. 3 is a flow chart illustrating an example of additional operations 300 that may be performed as part of looking up the identity of the person 205 of the method 200 of FIG. 2.

At 301, the computing device determines whether or not the biometric matches an identity or other entry in the data store of the back end. This may be determined by the computing device communicating with the back end. If so, the flow may proceed to 305. Otherwise, the flow may proceed to 302.

At 302, after the computing device determines the biometric does not match an identity or other entry in the data store of the back end, the computing device may prompt for enrollment. This may be because the lack of a match between the biometric and an identity in the data store of the back end may mean that the person has not enrolled in the system for boarding pass-less airport security screening with which the computing device is associated. As such, the person may be prompted to enroll. Such enrollment may involve the participation of security personnel at the computing device, such as where such security personnel verify a physical form of identification such as a state issued driver's license or identification card.

The flow may then proceed to 303 where the computing device may determine whether or not the person has enrolled. If so, the flow may proceed to 305. Otherwise, the flow may proceed to 304 where the computing device may output an error that the person is not enrolled.

At 305, after the computing device determines the biometric matches an identity or other entry in the data store of the back end, the computing device may determine whether or not an airline or other identifier is stored in the data store of the back end. This may also be determined by the computing device communicating with the back end. If so, the flow may proceed to 308 where the computing device may transmit the airline or other identifier to the airline computing system. Otherwise, the flow may proceed to 306.

At 306, the computing device may prompt the person to provide the airline or other identifier. The flow may then proceed to 307 where the computing device determines whether or not the airline or other identifier is provided. If so, the flow may proceed to 308 where the computing device may transmit the airline or other identifier to the airline computing system. Otherwise, the flow may proceed to 304 where the computing device may output an error that electronic boarding pass information cannot be obtained.

Although the additional operations 300 are illustrated and described as including particular operations performed in a particular order, it is understood that this is an example. In various implementations, various orders of the same, similar, and/or different operations may be performed without departing from the scope of the present disclosure.

For example, in some implementations a person may not be able to enroll at the computing device. In such an implementation, the flow may proceed from 301 directly to 304 and the person may utilize other means to enroll.

Figure 4:
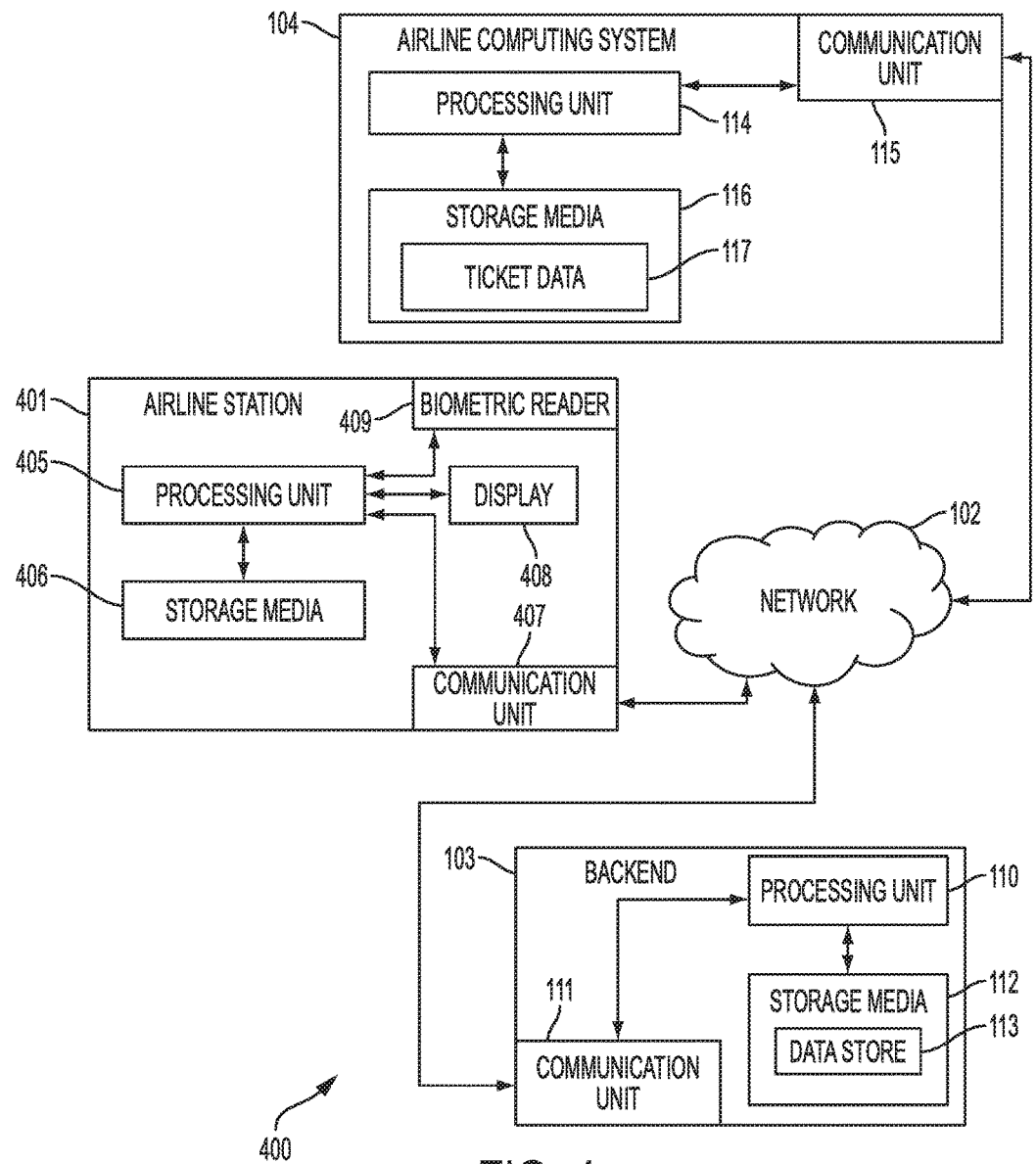
FIG. 4 is a block diagram illustrating a boarding pass-less airline processing system.

FIG. 4 is a block diagram illustrating a boarding pass-less airline processing system 400. The system 400 may include an airline station computing device 401 communicably coupled to a security back end 103 and an airline computing system 104 via one or more wired or wireless communication networks 102 (which in some implementations may be the security back end 103, the airline computing system 104, and/or the network 102 of the system 100 of FIG. 1).

Similar to the security station computing device 101 of the system 100 of FIG. 1, the airline station computing device 401 may include one or more processing units 405, non-transitory storage media 406, communication units 407, displays 408, and/or biometric readers 409. The processing unit 405 may execute one or more instructions stored in the storage media 406 to perform one or more functions relate to check in of flyers (such as purchasing flights or upgrades to existing flights, confirming that a person will be on a flight, assigning seat numbers, checking baggage, and so on), boarding of flyers (such as allowing a person on board a flight, confirming that the person has gone on board the flight, and so on), and so on.

For example, the processing unit 405 may execute instructions allowing the airline station computing device 401 to obtain biometric data from a person, transmit the biometric data to the security back end 103, receive an identifier for the person from the security back end 103, transmit the identifier to the airline computing system 104, and receive electronic boarding pass information from the airline computing system 104. The airline station computing device 401 may then display the electronic boarding pass information on the display 408 as part of and/or to otherwise facilitate check in, boarding, and/or other operations.

In this way, a person may be able to check in, board, and/or participate in other operations without obtaining a boarding pass and/or providing identification other than the biometric. When combined with the system 100 of FIG. 1, a person may be able to proceed through an entire airport experience without ever obtaining a boarding pass and/or providing identification other than the biometric. This may be a less burdensome process for flyers and/or airlines than a traditional airline processing system. This may also be more cost effective for airlines as they may be able to omit issuing boarding passes to flyers, training staff to validate various forms of identification, and so on.

Figure 5:
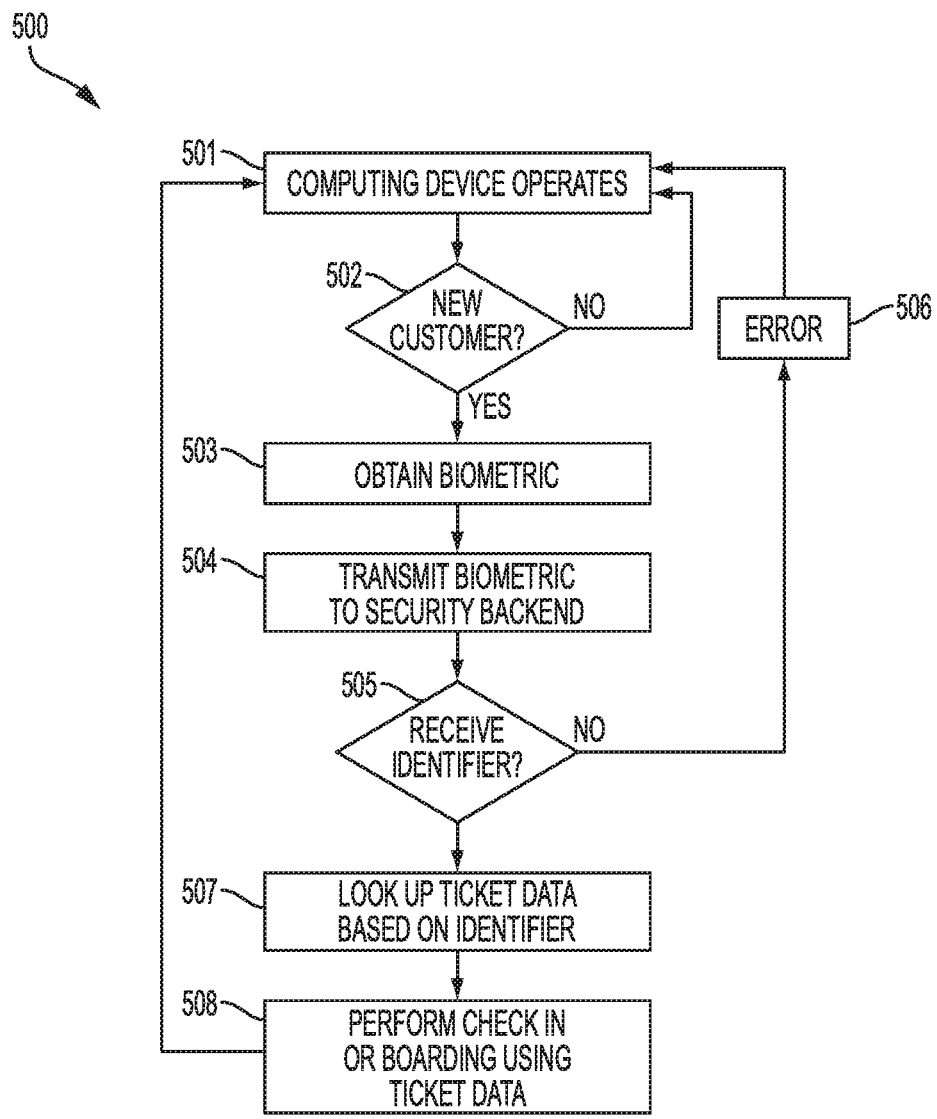
FIG. 5 is a flow chart illustrating a method for boarding pass-less airline processing. This method may be performed by the system of FIG. 4.

FIG. 5 is a flow chart illustrating a method 500 for boarding pass-less airline processing. This method 500 may be performed by the system 400 of FIG. 4.

At 501, a computing device may operate. At 502, the computing device may determine whether or not a new customer is to be processed. Such processing may be for check in, boarding, and/or other airline processing operations. If not, the flow may return to 501 where the computing device continues to operate. Otherwise, the flow may proceed to 503.

At 503, after the computing device determines a new customer is to be processed, the computing device may prompt for the person to provide a biometric. The flow may then proceed to 504 where the computing device may transmit the biometric to a back end of a security system. The back end of the security system may match the biometric to a user account or other data store entry that identifies the person associated with the biometric and may provide an airline and/or other identifier in response.

Next, the flow may proceed to 505 where the computing device determines whether or not an airline and/or other identifier is received from the back end of the security system in response to transmitting the identifier. If not, the flow may proceed to 506. Otherwise, the flow may proceed to 507.

At 506, after the computing device determines that the airline and/or other identifier for the person is not received, the computing device may output an error message. The flow may then return to 501 where the computing device continues to operate.

At 507, after the computing device determines that the airline and/or other identifier for the person is received, the computing device may look up ticket data and/or other boarding pass information based on the airline and/or other identifier. For example, the computing device may transmit the airline and/or other identifier to an airline computing system and receive the ticket data and/or other boarding pass information in response.

Next, the flow may proceed to 508 where the computing device may perform one or more check in, boarding, and/or other airline processing operations using the ticket data and/or other boarding pass information. The flow may then return to 501 where the computing device continues to operate.

Although the example method 500 is illustrated and described as including particular operations performed in a particular order, it is understood that this is an example. In various implementations, various orders of the same, similar, and/or different operations may be performed without departing from the scope of the present disclosure.

For example, the example method 500 is illustrated and described at 505-506 as outputting an error message if an identifier for the person is not received. However, in various implementations the computing device may utilize other mechanisms to identify the person if an identifier is not received. For example, the computing device may direct an operator to manually identify the person by having the person produce as state issued driver's license or identification card, passport, or other form of identification. Various configurations are possible and contemplated.

As described above and illustrated in the accompanying figures, the present disclosure relates to systems, methods, apparatuses, and computer program products for boarding pass-less airport security screening for flyers. A person may provide biometric data such as a fingerprint to a computing device as part of a security screening. The biometric data may be used to look up an identifier such as a frequent flyer number for the person from a back end. The identifier may be used to have electronic boarding pass information sent to the computing device, which may be used to clear the person and/or otherwise facilitate the security screening. In this way, the security screening may be performed without the user providing a boarding pass and/or identification other than the biometric. In some implementations, these techniques may also be used for boarding pass-less airline processing.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. An aircraft boarding screening system, comprising:
   at least one non-transitory storage medium storing a set of instructions;
   at least one communication component communicably connected to an identification system;
   an image capture device; and
   at least one processor communicably coupled to the non-transitory storage medium, the communication component, and the image capture device, the at least one processor operative to execute the set of instructions in order to:
      obtain an electronic representation of at least a portion of a face of a person via the image capture device;
      receive an identifier for the person obtained by comparing the electronic representation against a stored electronic representation, the electronic representation and the stored electronic representation not included in the identifier;
      obtain electronic pass information for the person using the identifier; and
      allow the person to board an aircraft if the identifier and the electronic pass information indicate the person has a ticket for a flight associated with a particular boarding checkpoint.

2. The aircraft boarding screening system of claim 1, wherein the identifier indicates that the person has a passport.

3. The aircraft boarding screening system of claim 1, wherein a government identification system compares the electronic representation against the stored electronic representation.

4. The aircraft boarding screening system of claim 1, wherein the identifier uniquely identifies the person.

5. The aircraft boarding screening system of claim 1, wherein the comparison of the electronic representation against the stored electronic representation compares facial traits between the electronic representation and the stored electronic representation.

6. The aircraft boarding screening system of claim 1, wherein the at least one processor obtains the electronic pass information by matching the identifier with information obtained by scanning a boarding pass.

7. The aircraft boarding screening system of claim 1, wherein the at least one processor comprises at least:
   a first processor of a first electronic device; and
   a second processor of a second electronic device that is communicably coupled to the first electronic device.

8. A boarding checkpoint system, comprising:
   at least one non-transitory storage medium that stores instructions;
   at least one communication component communicably connected to a security screening computing system;
   a boarding checkpoint; and
   at least one processor communicably coupled to the non-transitory storage medium, the communication component, and the boarding checkpoint, the at least one processor configured to execute the instructions in order to:
      obtain an electronic representation of a face of a person;
      receive an identifier for the person using the electronic representation of the face of the person, the electronic representation of the face of the person is not included in the identifier; and
      allow the person past the boarding checkpoint based on electronic ticket information obtained using the identifier.

9. The boarding checkpoint system of claim 8, wherein the at least one processor obtains the electronic representation of the face of the person contemporaneously with allowing the person past the boarding checkpoint.

10. The boarding checkpoint system of claim 8, wherein the at least one processor alters the electronic ticket information.

11. The boarding checkpoint system of claim 10, wherein altering the electronic ticket information includes assigning a seat number.

12. The boarding checkpoint system of claim 8, wherein the electronic representation of the face of the person is obtained from a live image.

13. The boarding checkpoint system of claim 8, wherein the at least one processor comprises at least:
   a first processor of a first electronic device; and
   a second processor of a second electronic device that is communicably coupled to the first electronic device.

14. The boarding checkpoint system of claim 8, wherein the at least one processor receives the identifier based on a match between the electronic representation of the face of the person and a governmental file for the person.

15. A method for boarding screening, comprising:
   obtaining an image of a face of a person using at least one processor;
   receiving an identifier for the person that does not include the image, using the at least one processor, the identifier obtained by an identification system that compares the image against stored images; and
   determining whether to allow the person to pass a boarding checkpoint and board an aircraft, using the at least one processor, based on electronic ticket information obtained using the identifier.

16. The method of claim 15, further comprising allowing the person to pass if the electronic ticket information indicates the person has a flight on the aircraft.

17. The method of claim 15, further comprising preventing the person from passing the boarding checkpoint if the identifier indicates that an identity of the person is unknown.

18. The method of claim 15, further comprising preventing the person from passing the boarding checkpoint if the electronic ticket information indicates the person does not have a ticket for a flight on the aircraft.

19. The method of claim 15, further comprising providing the image of the face of the person as evidence that the person boarded a flight.

20. The method of claim 15, wherein the stored images are stored as part of an identification process that involves verifying identity documents for people whose images are being stored.

* * * * *